(12) United States Patent
Zitron et al.

(10) Patent No.: US 6,375,447 B1
(45) Date of Patent: Apr. 23, 2002

(54) APPARATUS FOR DEWATERING AND PELLETIZING PARTICULATE FUEL

(75) Inventors: Zaiman Zitron, Blairsville; James W. Parkinson; David J. Akers, both of Indiana, all of PA (US)

(73) Assignee: CQ Inc., Homer City, PA (US)

( * ) Notice: Subject to any disclaimer, the term of this patent is extended or adjusted under 35 U.S.C. 154(b) by 88 days.

(21) Appl. No.: 09/624,346

(22) Filed: Jul. 24, 2000

Related U.S. Application Data

(63) Continuation-in-part of application No. 09/162,068, filed on Sep. 29, 1998, now Pat. No. 6,099,770.

(51) Int. Cl.⁷ .................................................. B29B 9/08
(52) U.S. Cl. ...................... 425/86; 425/331; 425/376.1; 425/382 R; 44/596
(58) Field of Search .......................... 425/86, 331, 332, 425/356, 376.1, 382 R, 382.3, 380; 264/3.4, 3.6; 44/596

(56) References Cited

U.S. PATENT DOCUMENTS

| | | | | |
|---|---|---|---|---|
| 3,670,467 A | * | 6/1972 | Walker | 264/143 |
| 4,897,194 A | * | 1/1990 | Olson | 100/129 |
| 5,486,102 A | * | 1/1996 | Ettie et al. | 425/382 R |
| 5,792,485 A | * | 8/1998 | Korse et al. | 425/331 |

* cited by examiner

*Primary Examiner*—Nam Nguyen
*Assistant Examiner*—Thu Khanh T. Nguyen
(74) *Attorney, Agent, or Firm*—James L. Bean

(57) ABSTRACT

An apparatus for pelletizing a feed material containing finely divided solids and water by compressing the feed material in the die cavities of a pellet mill and permitting excess water to escape from the material being compressed through at least one water escape opening in each die cavity.

22 Claims, 3 Drawing Sheets

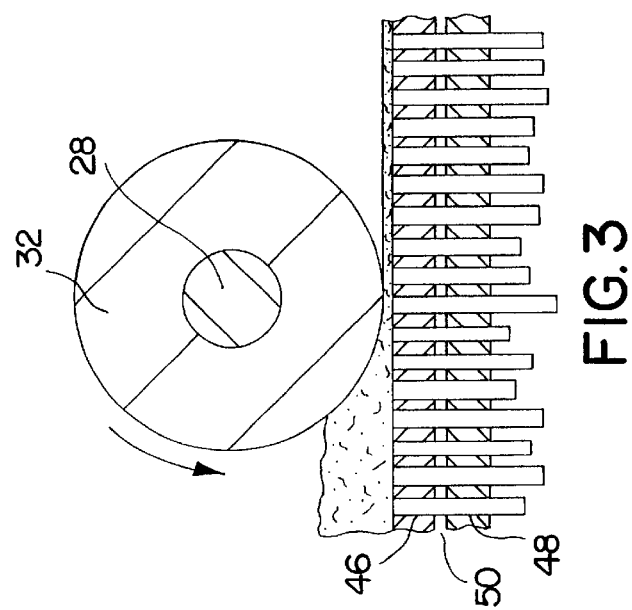
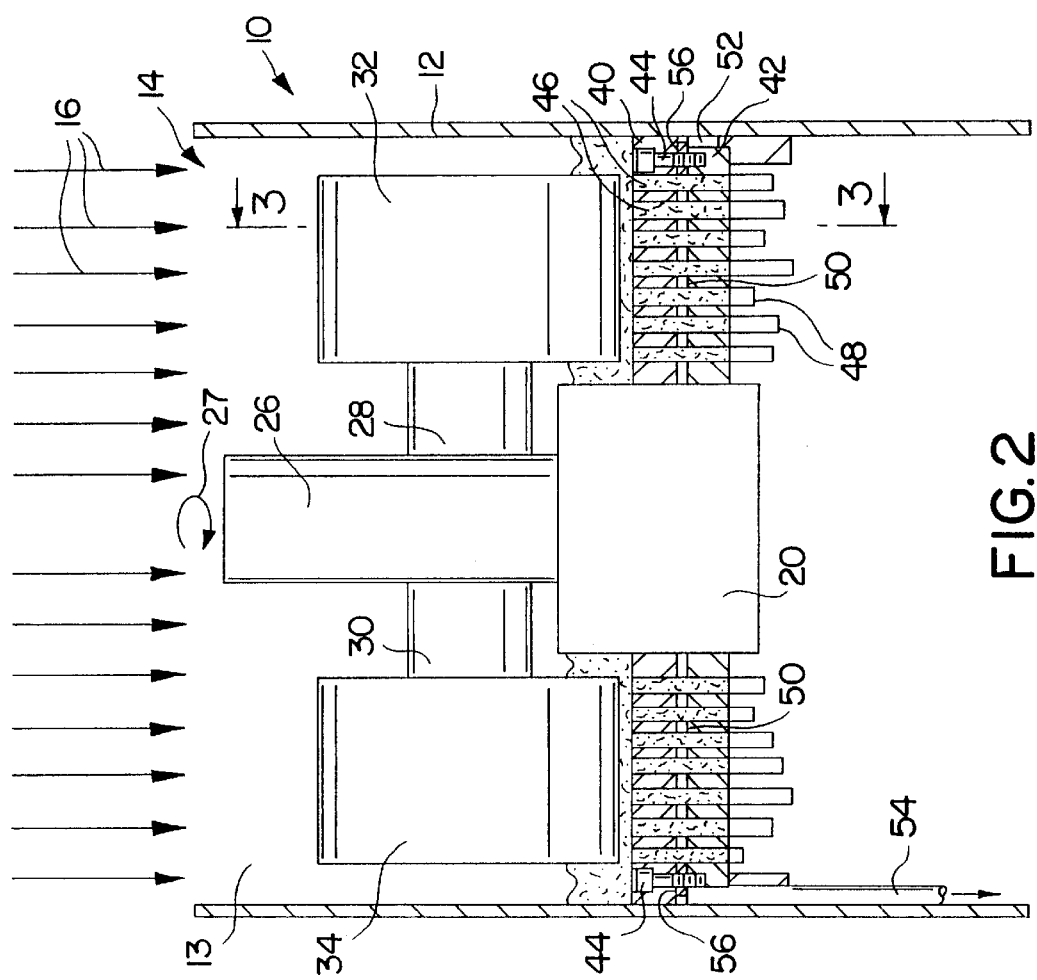

APPARATUS FOR DEWATERING AND PELLETIZING PARTICULATE FUEL

This is a continuation-in-part of co-pending application Ser. No. 09/162,068 filed Sep. 29, 1998 now U.S. Pat. No. 6,099,770.

BACKGROUND OF THE INVENTION

1. Field of the Invention

This invention relates to apparatus for and a method of producing pellets from a water-containing feed material, and more particularly to such apparatus and method for dewatering and pelletizing feed materials containing an excess of water.

2. Description of the Prior Art

It is well known to form finely divided solid particles into pellets to facilitate handling and use of the products. Charcoal is formed into briquettes for use in backyard barbecues and metal ores are formed into pellets to be fed into smelting furnaces. Animal feeds are formed into pellets to minimize waste, and waste materials are pelletized to facilitate handling and disposal. Other pelletizing operations too numerous to mention are well know.

In many commercial pelletizing operations, the feed material is a product of a controlled manufacturing process and the composition is consistent so that pelletizing is easily controlled; in others, the feed composition varies so greatly that pelletizing must be carefully monitored and controlled. For example, it is well known that variations in the amount of water or liquid in a feed material will have a marked effect both on the ability to form the material into pellets and on the strength and integrity of the pellets formed. Commercial pelletizers may have feed blenders and mixers including means for the addition of water or other liquids as necessary to enable the formation of competent pellets; however, such devices do not include dewatering systems for the removal of excess moisture.

Substantial effort has been and continues to be expended to economically recover and use products such as coal fines, biomass and waste products as fuels, but these efforts have met with limited success. As a result, industry is compelled to spend substantial sums to dispose of such waste products, and the disposal procedures have not always been satisfactory. For example, the large volumes of coal fines produced in the washing of mined coal have an excessively high water content for economic recovery and use despite their potential fuel value. Such coal fines, which normally have a particle size of about 1 mm or less, are routinely collected in tailing ponds as waste. This practice is not only expensive but also harmful to the environment.

Similar problems plague other industries such as the paper and plastics industries where the substantial waste products are not easily disposed of. While furnaces have been designed to burn many such waste products as fuels, such furnaces are expensive both to design and to operate. Specialized materials handling equipment may be required and operation of the furnaces is erratic and difficult to control.

U.S. Pat. No. 5,743,924 discloses a pelletized fuel made from a mixture of finely divided coal particles, paper making sludge waste, waste plastics and waste paper, which products are mixed together and pelletized without the use of adhesives or binders. A commercial pelletized fuel plant constructed in accordance with this patent utilizes sludge from a paper making facility, in combination with finely divided coal and shredded plastic materials, and is utilized by the paper making facility as fuel. This commercial facility not only realizes substantial savings on the cost of fuel over the previously used coal, but also saves the cost of disposal of the waste sludge. Further, substantial reductions in $SO_x$, $NO_x$, and particulate emissions are realized. Since the present invention is particularly useful in pelletized materials of the type disclosed in Pat. No. 5,743,924, the disclosure of this patent is incorporated hereby by reference.

U.S. Pat. No. 5,658,357 discloses a process for producing coal logs or compacts from finely divided coal particles, utilizing laboratory procedures, but no commercial facility utilizing the process is believed to be in operation. The described process includes accurate control of the water content, accurate control of the zeta potential of the product, and the use of very high pressures over an extended time during which excess water may be expressed. The manner of expressing the water is not disclosed.

Slurry and sludge dewatering devices are also known in which excess water is extracted from a slurry or sludge pumped or forced through the devices. Examples of such dewatering devices may be found in U.S. Pat. Nos. 3,938,434; 4,798,194; and 5,173,196. These devices generally employ an elongated filtering chamber through which the solids/liquid mixture passes, with excess liquid being permitted to escape through filtered openings in the sidewalls of the chamber to produce an increased solids concentration or compact discharged from the end of the chamber. The problem of solid particles tending to plug the filter openings is discussed, for example, in U.S. Pat. No. 3,938,434.

While the pelletized fuel disclosed in the above-mentioned U.S. Pat. No. 5,743,924 represents a significant advance in the use of biomass and waste as a fuel, the processing costs and the moisture content of the pellets have been relatively high. These factors affect the strength and abrasion resistance of the pellets and limit the distance which the fuel can be economically transported. Further, the water content of the biomass and waste components must be monitored since excessive water content can result in the inability to form a satisfactory pellet. These factors make it difficult for such fuels to be price competitive with coal in the steam production and other markets. Similarly, excess liquid in the feed material can adversely affect other commercial pelletizing operations.

OBJECTS OF THE INVENTION

Accordingly, it is a primary object of the present invention to produce a pelletized material which may be produced at a lower cost and which can be processed into pellets having a relatively low moisture content and high strength.

Another object of the invention is to produce such a pelletized material which may incorporate a wide variety of biomass and/or waste material.

Another object of the invention is to provide a method of producing a pelletized product in which the material being pelletized is effectively dewatered during the pelletizing process.

Another object is to provide such a method in which the materials to be dewatered and pelletized are processed in a pelletizing die having water escape openings in the die walls to permit excess water to escape during the pressurization and pelletizing process.

Another object is to provide an improved pelletizing apparatus including a pelletizing die which permits the escape of excess moisture during the pelletizing process.

Another object is to provide an improved pelletizing die which may be installed in new or existing commercial pelletizing apparatus.

SUMMARY OF THE INVENTION

The foregoing objects and advantages of the invention are achieved in accordance with the present invention in which a pelletized product is produced from a finely divided pelletizable feed material, or a mixture of finely divided feed materials and water, by pressing the material through die openings in a commercial pelletizer such as a Kahl, California, or a Bliss pellet mill and permitting excess water to be expelled from the die during pelletizing. While the invention may be utilized in the processing of various raw materials, it has been found especially useful in producing a pelletized fuel from a finely divided material such as coal or a mixture of coal with a combustible biomass and/or waste material, and the invention will be described with specific reference to such materials, it being understood that the invention is not so limited.

The die of the improved pelletizer includes one or more water outlet openings preferably at a location, or locations, spaced upstream from the pellet discharge outlet of the die. As the material being processed is pressed through the die, pressure builds in the material progressively from the entrance to a point adjacent the outlet. This build-up of pressure causes excess water in the material to flow through the openings in the die wall. Continued movement of the material expels the dewatered and pelletized material from the die openings in the conventional manner. In one embodiment, a pressure enhancing means is provided for increasing the pressure in the material as it passes through the dies to enhance dewatering and produce a more compact pellet.

The dimensions of the water outlet openings in the die walls are determined by the nature of the material being processed as well as the material particle size. The water outlets generally may be substantially greater than the minimum particle size of the material being processed, and where the material contains an element of fibrous material such as paper pulp sludge or the like, the openings may be greater than for materials consisting essentially of solid particulates such as coal fines. The pressurization/dewatering process which enables the use of die wall openings greater than the particle size without expelling excessive particles from the openings cannot be determined for certain, but it is believed the particles tend to bridge the openings in a manner to permit the water under high pressure to be expelled without the particles entering and plugging the openings. The expelled water is collected and led from the pellet mill for discharge as waste or for further treatment.

In accordance with one embodiment of the invention, the die of a pellet mill such as a Kahl pelletizer may be made as a plurality of plates assembled together as by bolting, with the water outlets being provided by the space between adjacent plates, which space can be controlled as by the surface finish of mating plate surfaces, or the use of shims, spacers, or the like between the plates.

In accordance with another embodiment, a back pressure plate is supported in closely spaced relation to the outlet of the pellet mill, with the back pressure plate being driven for rotation about the pellet mill axis at a rate different from the rate of the pressure rolls of the mill. The back pressure plate has a substantially flat surface with spaced openings extending therethrough so that, in operation, the flat surface will underlie a portion only of the die openings while the plate openings will underlie the remaining die openings. By driving the pressure rolls and back pressure plate at different speeds, a portion of the die outlets will be blocked as the pressure rolls pass thereover on each revolution, thereby increasing the pressure in the blocked dies. Continued operation will result in these die openings being unobstructed on a subsequent pass, or passes, of the pressure roll to expel the dense pellets.

BRIEF DESCRIPTION OF THE DRAWINGS

The foregoing and other objects and advantages of the invention will be apparent from the detailed description contained herein below, taken in conjunction with the drawings, in which:

FIG. 2 is a view similar to FIG. 1 in which the die of the pellet mill has been modified in accordance with the present invention;

FIG. 3 is a fragmentary sectional view taken along line 3—3 of FIG. 2;

DESCRIPTION OF THE PREFERRED EMBODIMENTS

Figure 4:
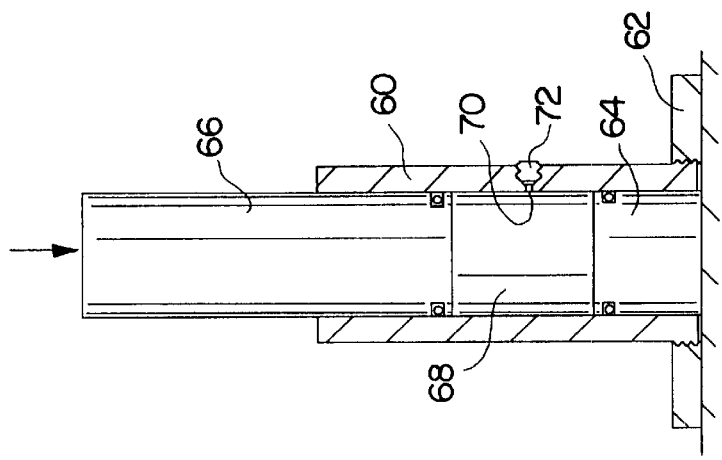
FIG. 4 is a sectional view schematically illustrating laboratory test apparatus employed to produce pellets in accordance with the present invention.
Figure 1:
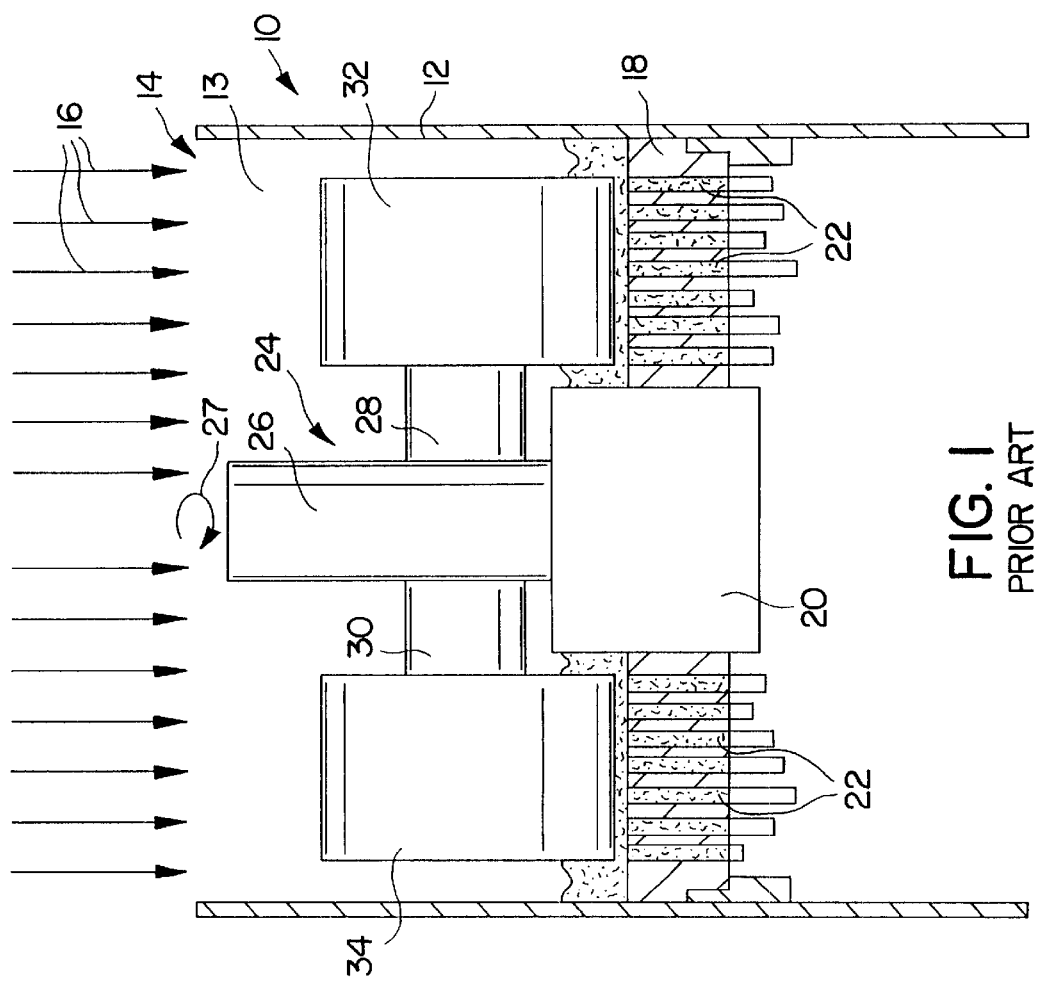
FIG. 1 is a sectional view schematically illustrating the operation of a commercial Kahl-type pellet mill.

Referring now to the drawings in detail, a commercial Kahl-type pellet mill is illustrated schematically in FIG. 1 and designated generally by the reference number 10. Pelletizer 10 includes a generally cylindrical housing 12 defining a hopper or fuel chamber 13 having an open top 14 for receiving feed materials to be pelletized as indicated generally by the arrows 16. A rigid die plate 18 is mounted within the housing 12 and extends thereacross, with a drive housing 20 mounted within a central opening in the die plate. Die plate 18 has a uniform pattern of die openings 22 formed in and extending therethrough, and a roller presser assembly 24 includes a vertically extending central drive shaft 26 having its lower end extending into and supported by drive housing 20 for rotation as shown by arrow 27 by a suitable power means, not shown. A pair of roller axles 28, are mounted on and project laterally from shaft 26 and support rollers 32, 24, respectively, on their distal ends for rotation at a fixed distance above the top surface of die 18.

In operation of the Kahl-type pelletizer described above and schematically illustrated in FIG. 1, the feed material 16 is fed into the open top of hopper 13 and continuously distributed across the top surface of the die plate 18. Shaft 26 is driven to rotate the rolls 32, 34 about the vertical axis of shaft 26 so that the cylindrical surfaces of the rollers 32, and 34 are driven to roll around the top surface of the die plate with their lower surfaces spaced slightly above the die plate, to compact the loose feed material and press the material into and through the die openings 22. The diameter and axial length of the die openings 22 are such that the frictional resistance to flow of material through the openings will produce a high compaction pressure within the material in the die to pelletize the material before being discharged.

As is known, the pelletizing process depends upon surface-to-surface contact of the solid particles under high pressure. As is also known, when the feed material contains an excess of water, the non-compressible characteristic of water can interfere with the surface-to-surface contact of the solid particles and thereby interfere with or completely prevent pelletization. Also, water acts as a lubricant in the dies so that an excess of water may result in a substantial reduction in pressure in the dies. Thus, pelletization of many waste products such as coal fines from sediment ponds, paper making sludge, and other waste products normally containing high volumes of water frequently cannot be pelletized in commercial pellet machines to form a satisfactory pellet having sufficient strength and stability to withstand handling, transportation, and the like. If such materials are pelletized, the water content must be reduced and carefully controlled, and excessively high pressure and slow pelletizing operations may be required.

Referring now to FIG. 2, the basic configuration of the pellet mill according to the present invention is identical to that described above with reference to FIG. 1, with the exception of the structure of the die plate to be described hereinbelow. Accordingly, like reference numbers are used to designate like parts in the two figures. In the FIG. 2 embodiment, the die assembly comprises an upper plate 40 and a lower plate 42 rigidly assembled in fixed relation to one another as by bolts 44. An array of die openings 46 are formed in and extend through the top die plate 40, with openings 46 being in relatively close spaced relation to one another as is conventional in pellet mills. A second array of die openings 48 are formed in and extend through the bottom die plate 42, with the individual openings 48 each being in axial alignment with a die opening 46 in the top plate so as to, in effect, form continuous openings through the die defined by plates 40 and 42.

In accordance with the present invention, as the feed material 16 is expressed through the die openings in plates 40, 42, pressure builds within the material, and any excess moisture therein will tend to flow out of the pressurized material through the space 50 between the plates 40, 42. This water collects in an annular collection ring 52 extending around the periphery of bottom plate 42, and is permitted to escape through a drain 54.

In FIGS. 2 and 3, the space 50 between the top and bottom plates 40, 42, respectively, is exaggerated for illustration purposes only. In practice, and depending on the size of particles and the nature of the fuel material 16, this space may be extremely small. It has been found in laboratory testing that the high pressure in the die chambers will result in the normal manufacturing tolerances in the formation of the mating surfaces of plates 40, 42, permitting sufficient water to flow therebetween from the die chambers to substantially reduce the amount of water in the material being pelletized for certain materials and water content. In a high speed commercial operation, and particularly where a composite fuel is being pelletized from a mixture of, for example, coal fines, paper sludge, shredded plastic, and/or other waste products, the spacing between die plates may be increased. This may be accomplished, for example, by the use of spacer washers or thin shims, indicated at 56 in FIG. 2, or by increasing the roughness of the mating surface of the die plates.

Referring now to FIGS. 4–7, a back pressure plate 80 is mounted on the drive housing 20 beneath the die plate 42 for rotation about the vertical axis of the pellet mill shaft 26. Plate 80 has its top surface 82 supported in closely spaced relation to the bottom surface of plate 42. Plate 80 is in the form of an annular disc having a circular recess or countersink 84 formed in its top surface for mounting onto the drive 20 by suitable means, not shown. The outer circumference fits closely within the collection ring 52.

Figure 6:
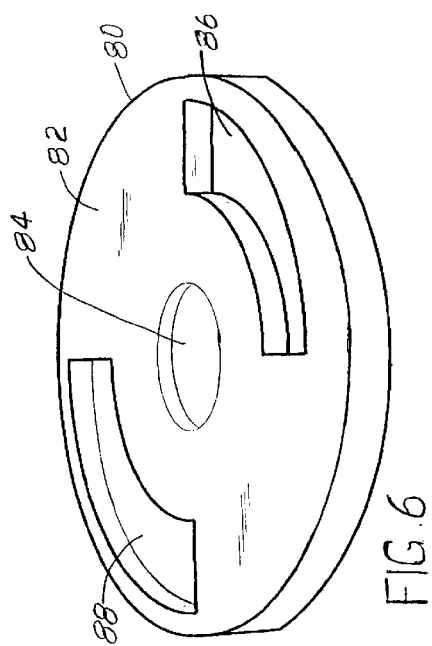
FIG. 6 is an isometric view, on a reduced scale, of a back pressure plate used in the embodiment of FIG. 5.
Figure 7:
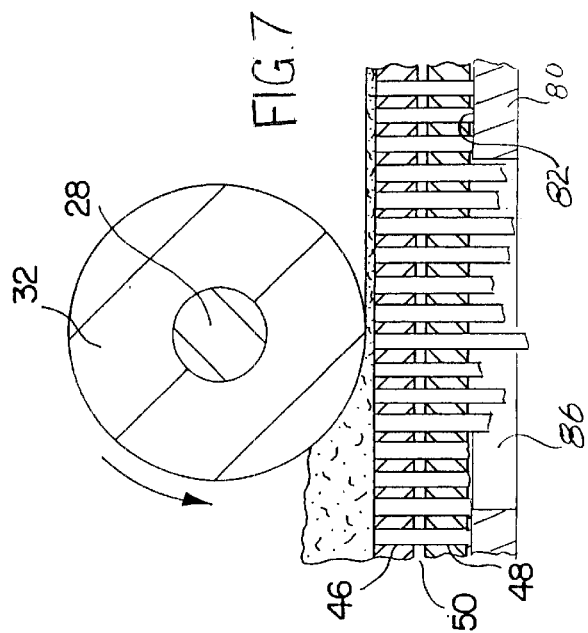
FIG. 7 is a fragmentary sectional view taken along line 7—7 of FIG. 5.
Figure 5:
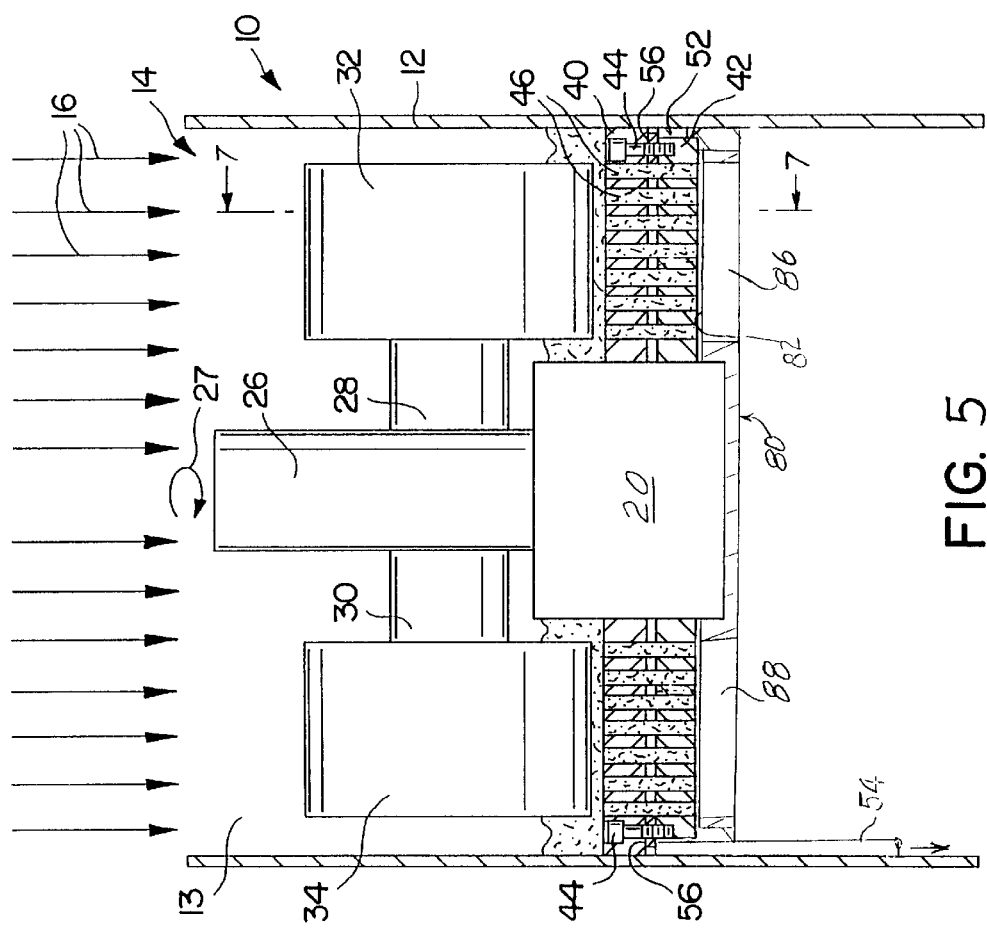
FIG. 5 is a view similar to FIG. 2 showing an alternate embodiment of the invention.

As best seen in FIG. 6, plate 80 has a pair of arcuate through openings 86, 88 formed therein in diametrically opposed relation with each preferably extending about 90° around the plate. The radial extent of the openings 86, 88 corresponds substantially to the pattern of die openings in die plates 40, 42. Thus, at any given time, two sets of die openings 46, 48 located one above each of the pressure plate openings 86, 88, respectively, are open to permit the pelletized material to flow therefrom, while the remaining die openings are effectively blocked by the top surface 82. Thus, when rolls 32, 34 pass above a die opening which is blocked by the back pressure plate, an increase in pressure is produced within that die cavity, thereby increasing the tendency to expel excess water and to produce a more compact pellet within that die cavity.

The back pressure plate 80 is driven for rotation about its vertical axis at a rate different from that of the shaft 26 so that the groups of die cavities blocked and the groups which are not blocked are continuously changing. By synchronizing the relative rotating rates of the shaft 26, and consequently the rolls 32 and 34, and of the back pressure plate 80, the degree of compaction within the individual die cavities can be controlled. For example, this relative rate may be varied so that, on average, each particle of material passing through a die will be blocked at least once, or as many times as necessary to produce a pellet of the desired density and moisture content.

It is believed apparent that the back pressure plate may be employed to enable a reduction in the thickness of the die plate assembly, or to enable pelletizing of a material containing a substantial excess of water. It is also believed apparent that the back pressure plate may be employed with other types of pellet mills, including extrusion type pellet presses. Also, the back pressure plate may be used with commercial pellet mills such as the Kahl pellet mill to thereby increase the compaction pressure in the die cavity without use of the dewatering outlets in the die cavity walls as described above.

It has been found in laboratory testing that the water outlets may be larger than the size of the smallest particles and somewhat surprisingly, may be equal to or greater than the maximum particle size of the material being pelletized. This depends, to some extent, on the nature of the product being pelletized, with feed material containing a portion of fibrous material such as paper pulp sludge, shredded plastic, shredded paper or other biomass materials making it possible to use larger die wall openings, whereas the pelletization of solid particulate material such as coal fines or comminuted coal will require smaller die wall openings.

A laboratory test device was constructed to evaluate the invention in the pelletizing of different products under different circumstances. This test apparatus, shown in FIG. 4, consisted of an elongated pelletizing die cylinder 60 mounted in a supporting base flange 62 and having a cylindrical spacer plug 64 in its lower end, with spacer 64 closely fitting within the interior cylindrical wall of die 60. A movable piston or ram 66 was adapted to be inserted into the open top of the pelletizing die and a controlled pressure applying means, not shown, was provided to apply a load to the ram 66 to apply pelletizing pressure to material within the pellet chamber 68. A small circular opening 70 having a 1 mm diameter was formed in and extended through the cylinder wall 60 into the pellet chamber 68, and a removable plug 72 was provided to selectively close the outlet 70.

EXAMPLE 1

Tests were initially conducted to evaluate the effect on pellet strength of permitting the escape of water from the material being pelletized. In these tests, comminuted air dried coal having a top size of ½ mm was used, with varying amounts of moisture being added to the coal before being placed into the pellet chamber 68. In these tests, the moisture discharge port 70 was tightly closed with the plug 72 and the only escape for moisture was between the closely fitting machined walls of the plug 64 and ram 66 and the cylinder 60. In some tests, the ram and spacer were sealed with rubber as indicated at 74, thereby preventing any moisture discharge to simulate a conventional pelletizing die operation. In other tests, the seals were removed and moisture was observed escaping at moisture contents of 5% and greater. No solids could be visually detected in the discharged moisture. Load was applied to the ram 66 to apply a 3,000 PSIG load to the material in the pelletizing chamber. Above 15% moisture, no pellet could be formed when the pellet chamber was sealed. The results of this test are shown below:

TABLE

Comparison of Pellet Strength With and Without the Dewatering Die

| Moisture (percent) | Pellet Strength | |
|---|---|---|
| | No Seal Kgf | Sealed Kgf |
| 0 | 8½ | 8½ |
| 5 | 5½ | 4 |
| 7½ | 4½ | 2 |
| 10 | 3 | 1 |
| 15 | 3 | 0 |
| 20 | 3 | 0 |
| 25 | 3 | 0 |

EXAMPLE 2

In this example, the moisture discharge port 70 was opened and the spacer and piston were sealed so that the only escape path for moisture was through the discharge port. Again, 10 grams of air dried coal having a top size of less than ½ mm were mixed with 3 milliliters of water and the mixture placed in the die chamber. 3,000 PSIG of load was then applied and initially some coal particles were discharged with the water escaping from the port, but as the moisture level in the pellet dropped, clear water was discharged and a strong pellet was formed. Other tests were performed under the same conditions except that the moisture discharge port was closed. No pellet was formed.

While this test clearly demonstrated that a strong pellet can be formed from finely divided comminuted coal or coal fines alone, with the application of pressure as low as 3,000 PSIG, it demonstrated that a smaller die opening is required than was used in the laboratory apparatus, wherein the water outlet diameter was twice the maximum size of particle used to form the pellet.

EXAMPLE 3

Using the laboratory equipment set up as described above in example 2, in which the moisture port was open and rubber seals were employed to seal the ram and spacer, tests were conducted to evaluate the effect of the addition of biomass to coal fines. In this test, five grams of −½ mm top size air dried coal, five grams of paper mill sludge, and three ml of water were mixed and placed in the die chamber. 3,000 PSIG of pressure was applied and clear water only was observed to be discharged from the port. A strong pellet was formed. It was apparent that the presence of the paper sludge tended to bridge the outlet opening and retain the smaller coal particles from escaping. A second test was performed with the moisture discharge port closed, and no pellet was formed.

It was apparent that, in the operation of a commercial pellet mill embodying the invention, the dimensions of the openings in the die cavities will depend primarily on the composition and particle size of the feed stock to be pelletized. In the pelletizing of fuel such as that described in the above-mentioned U.S. Pat. No. 5,743,924, wherein paper mill sludge, waste paper and shredded plastic materials are blended with coal fines or comminuted coal, the size of the die cavity wall openings can be substantially greater than the mean size of the solid coal particles. Conversely, when only solid particulate material such as coal fines is being pelletized, smaller moisture outlet openings will be required.

It is also apparent that while a die plate assembly consisting of two die plates with the pelletizing cavities in alignment is illustrated, thereby providing a single moisture outlet extending completely around the periphery of each die cavity, a greater number of die plates may be used to provide additional moisture outlets along the length of the pelletizing die openings.

While the invention has been described with reference to a Kahl-type pelletizer, the invention may also be employed with other pelletizers such as a bliss, California or Andritz Sprout-Bauer pellet mill employing a cylindrical die assembly consisting of a plurality of concentric cylindrical die plates rigidly assembled together and having generally radially extending die openings, with the die being driven for rotation about a fixed axis roller, or even with opposed roll capsulating pellet machines. For example, such opposed roll pellet mills may employ rolls constructed of a plurality of discs or wheel-like elements mounted coaxially, with the space between adjacent discs defining the water escape outlets in the die cavities in the outer peripheral surface of the rolls. The invention may also be employed in connection with extrusion type presses.

Thus, while preferred embodiments of the invention have been disclosed and described in detail, it is apparent that the invention is not so limited and it is intended to include all embodiments which would be apparent to one skilled in the art and which come within the spirit and scope of the invention.

We claim:

1. A pellet mill for pelletizing a feed material containing finely divided solids and water, the pellet mill comprising:
    a material receiving chamber for receiving feed material to be pelletized,
    a die member forming a wall of said material receiving chamber,
    a plurality of die chambers formed in said die member in position to receive feed material from said material receiving chamber, said die chambers having substantially smooth wall surfaces,
    material pressing means for pressing feed material from said material receiving chamber into said die chambers and to apply pelletizing pressure to the material in the die chambers and to express water from the material, and at least one water outlet opening formed in said substantially smooth wall surface of each said die chamber, said at least one water outlet opening being dimensioned to permit the escape of excess water expressed from the finely divided solids under pelletizing pressure in the die chambers while preventing the escape of solids therethrough.

2. The pellet mill defined in claim 1, wherein said at least one water outlet opening has a minimum dimension greater than the size of the smallest particles in the feed material being pelletized.

3. The pellet mill defined in claim 1, wherein said die chambers are elongated, substantially cylindrical channels having an inlet opening into said material receiving chamber for receiving feed material and an outlet for discharging pellets, and wherein said at least one water outlet opening is in the form of an elongated, thin opening formed in an extending generally circumferentially of said substantially cylindrical channels.

4. The pellet mill defined in claim 3, further comprising back pressure enhancing means for increasing the pressure in said die chambers to thereby produce a more compact, competent pellet.

5. The pellet mill defined in claim 4, wherein said pressure enhancing means comprises a back pressure plate disposed adjacent said die outlets, said back pressure plate having at least one opening therethrough, and means for moving said back pressure plate so as to alternately obstruct and expose said die openings.

6. The pellet mill defined in claim 3, wherein said die member comprises a plurality of superimposed die plates supported in fixed relation to one another, and wherein each said die chamber comprises an elongated substantially cylindrical opening extending through said plurality of die plates.

7. The pellet mill defined in claim 6, wherein said die plates are in surface-to-surface contact with one another, and wherein said contacting surfaces of said die plates have a surface finish resulting in sufficient separation between the die plates to produce said at least one water outlet.

8. The pellet mill defined in claim 6, further comprising spacer means between said die plates, said spacer means providing separation between said die plates to define the dimension of said water outlet openings measured in the axial direction of said die chambers.

9. The pellet mill defined in claim 6, wherein said die member is a rigid annular disc assembly having a substantially planar top surface exposed in the bottom of said material receiving chamber, and a bottom surface substantially parallel to said top surface, said die chambers extending through said die plate assembly substantially perpendicular to said top and bottom surfaces.

10. The pellet mill defined in claim 9, wherein said material pressing means is driven for rotation about a central axis substantially parallel to the longitudinal axis of said die openings, said pellet mill further comprising a back pressure plate mounted adjacent said outlets for rotation about said central axis, said back pressure plate having a plurality of openings extending therethrough, and means for rotating said back pressure plate to alternately obstruct and expose said die outlets.

11. The pellet mill defined in claim 10, wherein rotation of said material pressing means and said back pressure plate are synchronized so that each said die outlet is covered by said back pressure plate at least once as said material pressing means passes thereover during the passing of any particle of material through the respective dies.

12. The pellet mill defined in claim 6, wherein said die member is a generally rigid hollow cylindrical assembly including a plurality of concentric cylindrical members supported in fixed relation, said die chambers being generally radially extending openings formed in and extending through said cylindrical members.

13. The pellet mill defined in claim 8, further comprising a water collection channel extending around the outer periphery of said die plate assembly for collecting excess water flowing through said water outlets, and drainage means connected to said channel permitting the drainage of water collected in said channel.

14. A pelletizing die for pelletizing a feed material containing finely divided solids and water in a pellet mill of the type including a die member, a plurality of die chambers having outlet openings and substantially smooth walls formed in the die member in position to receive feed material to be pelletized, and a material presser for pressing feed material into and through the die chambers and to apply pelletizing pressure to the material in the die chambers to form pellets, said pelletizing die comprising at least one water outlet opening formed in the substantially smooth wall surface of each said die chamber, said at least one water outlet opening being dimensioned to permit the escape of excess water from the finely divided solids under pelletizing pressure in the die chambers while preventing the solids from escaping therethrough.

15. The pelletizing die defined in claim 14, wherein said at least one water outlet opening has a minimum dimension greater than the size of the smallest particles in the feed material being pelletized.

16. The pelletizing die defined in claim 14, wherein said die chambers are elongated, substantially cylindrical channels having an inlet opening for receiving feed material and an outlet for discharging pellets, and wherein said at least one water outlet opening is in the form of an elongated, narrow opening formed in an extending generally circumferentially of said substantially smooth surface of the substantially cylindrical channel.

17. The pelletizing die defined in claim 16, wherein said die plate assembly further comprises a back pressure plate mounted adjacent and extending over and obstructing said die chamber outlets, said back pressure plate having at least one opening extending therethrough for exposing at a plurality of said die chambers outlet openings, said back pressure plate being supported for movement to alternately obstruct and expose said die chamber outlet openings.

18. The pelletizing die defined in claim 14, wherein said die member comprises a die assembly including a plurality of superimposed die plates supported in fixed relation to one another, and wherein each said die chambers comprise an array of elongates substantially cylindrical openings extending through each said die plate with each cylindrical opening in each die plate being axially aligned with a cylindrical opening in each other die plates.

19. The pelletizing die defined in claim 18, wherein said die plates are in surface-to-surface contact with one another, and wherein the contacting surfaces of said die plates have a surface finish resulting in sufficient separation between the die plates to produce said at least one water outlet.

20. The pelletizing die defined in claim 18, further comprising spacer means between said die plates, said spacer means providing separation between said die plates to define the dimension of said water outlet openings measured in the axial direction of said die chambers.

21. The pelletizing die defined in claim 18, wherein said die member is a rigid annular disc assembly having a substantially planar top surface exposed and a bottom surface substantially parallel to said top surface, said die chambers extending through said die plate assembly substantially perpendicular to said top and bottom surfaces.

22. The pelletizing die defined in claim 18, wherein said die member is a rigid cylindrical assembly including a plurality of cylindrical members rigidly mounted in concentric relation relative to one another, said die chambers extending generally radially through said cylindrical members in an annular pattern concentric with said cylindrical member.

* * * * *